United States Patent [19]

Nerwin

[11] 3,714,876
[45] Feb. 6, 1973

[54] PHOTOGRAPHIC CARTRIDGE

[75] Inventor: Hubert Nerwin, Rochester, N.Y.

[73] Assignee: Eastman Kodak Company, Rochester, N.Y.

[22] Filed: May 1, 1970

[21] Appl. No.: 33,676

[52] U.S. Cl. ..........................................95/13, 95/19
[51] Int. Cl. ..................................................G03b 17/52
[58] Field of Search ..............................95/13, 19, 22

[56] References Cited

UNITED STATES PATENTS

| | | | |
|---|---|---|---|
| 3,247,773 | 4/1966 | Doblin et al. | 95/31 R |
| 3,270,644 | 9/1966 | Finelli | 95/13 |
| 3,543,664 | 12/1970 | Kremp et al. | 95/31 R |
| 2,443,154 | 6/1948 | Wolff | 95/13 |
| 3,424,072 | 1/1969 | Hodgson et al. | 95/13 |
| 3,135,187 | 6/1964 | Mason et al. | 95/13 |
| 3,134,313 | 5/1964 | Gold et al. | 95/13 |

*Primary Examiner*—John M. Horan
*Assistant Examiner*—Alan A. Mathews
*Attorney*—Robert W. Hampton and J. Addison Mathews

[57] ABSTRACT

A cartridge of self-processing photographic film includes first and second supply chambers, one each for film and second or process elements, and a take-up chamber for collecting and storing processing waste material disposable with the cartridge. In a preferred form, film is supplied in the cartridge from a single roll and is advanced therefrom to a first position for exposure, then to a second position for processing, and finally to a take-up mechanism for winding the film back into a roll. Individual second elements are supplied as sheets in stacked relation in a second chamber, behind the film processing chamber, and are superposed or registered one at a time with the film for processing. After processing, the second sheet, with the image received thereon, is stripped from the film automatically and transported to the cartridge exterior at the same time the film is wound into the take-up chamber. Alternatively, the cartridge back may be opened for manual stripping of the finished print.

6 Claims, 7 Drawing Figures

HUBERT NERWIN
INVENTOR.

BY J. Addison Mathews
Robert W. Hampton
ATTORNEYS

HUBERT NERWIN
INVENTOR.

BY J. Address Mathew
Robert W Hampton
ATTORNEYS ated in U.S. Pat. Nos. 2,435,717; 2,880,658; 2,442,254 and 3,424,072.

PHOTOGRAPHIC CARTRIDGE

BACKGROUND OF THE INVENTION

The present invention relates to photographic cartridges and film packs. More particularly the invention relates to disposable cartridges packs for self-processing photographic film, and including means for stripping a finished print from the processing waste material and for collecting and storing said waste material in the cartridge.

It is well known in the self-processing photographic arts to supply film and transfer sheets either in roll form or in stacks of individual film and transfer sheets. It also is known to use both the roll and stack forms of supply in combination in a single apparatus, and, in a different apparatus, to strip a transfer or image receiving sheet from the film as the film is rolled into a storage chamber for latter disposal. Examples of the above are disclosed in U.S. Pat. Nos. 2,435,717; 2,880,658; 2,442,254 and 3,424,072.

All of the above types of apparatus have certain advantages, and it is believed that most will operate satisfactorily for their intended purpose. However, each also suffers from various problems, and none teaches the structural solutions represented by the present cartridge, wherein film is provided in a compact container that is simplified in its operation and that automatically strips the finished print from the processing waste material and stores such waste material in the cartridge for later disposal with the cartridge.

SUMMARY OF THE INVENTION

It is an object of the present invention to provide a cartridge for supplying a self-processing film system to the consumer in a form that permits convenient loading of the cartridge into the camera and disposal of the cartridge after exhaustion of the supply.

It is a further object of the present invention to provide a cartridge of the above type that is adapted to eject a finished print from the cartridge while storing processing waste material disposable with the cartridge.

It is a further object of the invention to provide a cartridge of the above type which does not require handling of the film or other processing material, except for the finished print, and more specifically does not require handling of fluids or waste materials coated or soaked in such fluids.

A still further object of the present invention is to provide a cartridge of one or more of the above types that may be attached to a camera to thereby cooperate with and define the back portion of the camera absent a separate cover door.

In accordance with one embodiment of the invention a cartridge includes first and second supplies, one each for first and second self-processing materials, and a take-up mechanism for receiving and storing one of such materials. One of the supplies, preferably that for a web of photosensitive material, is in roll form and is adapted to supply the material first to an exposure position, then to a processing position, and finally to the take-up mechanism. The other supply, preferably for a process or transfer material, is in the form of stacked process or transfer sheets and is adapted to supply the material to the processing position for registration with the first material. The cartridge may be opened after processing for removal of the finished print, or the print may be ejected automatically by advancing the first material to the take-up mechanism. In either case, waste material from such processing is collected and stored in the take-up mechanism for later disposal with the cartridge.

One particularly advantageous feature of the present invention is that the elements adapted to receive the final visible image are not only stripable from the waste material but also are supplied as pre-cut individual sheets having substantially the same physical shape and properties before processing as they will have after processing. This makes it possible to assure a print of pleasent aesthetic appearance by controlling these physical properties, and especially by precutting the print to square and accurately cut sides and corners during the manufacturing stage rather than in the camera.

DETAILED DESCRIPTION OF THE PREFERRED EMBODIMENT

Figure 1:
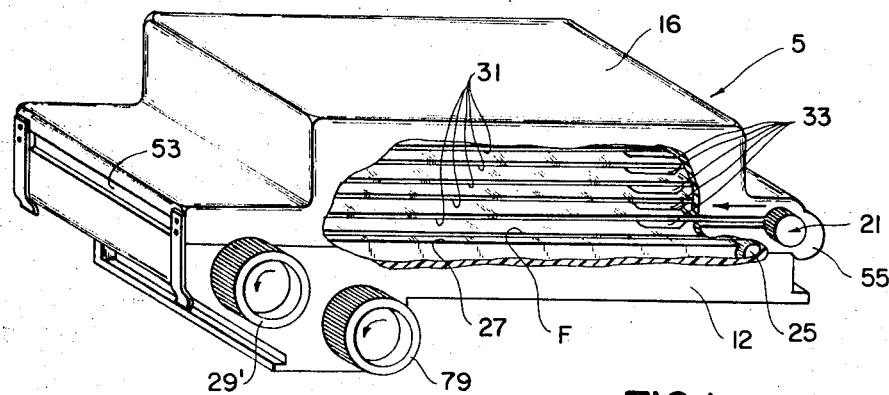
FIG. 1 is a pictorial view of a cartridge in accordance with the present invention, with a portion broken away to illustrate the stack of process or second sheets.
Figure 4:
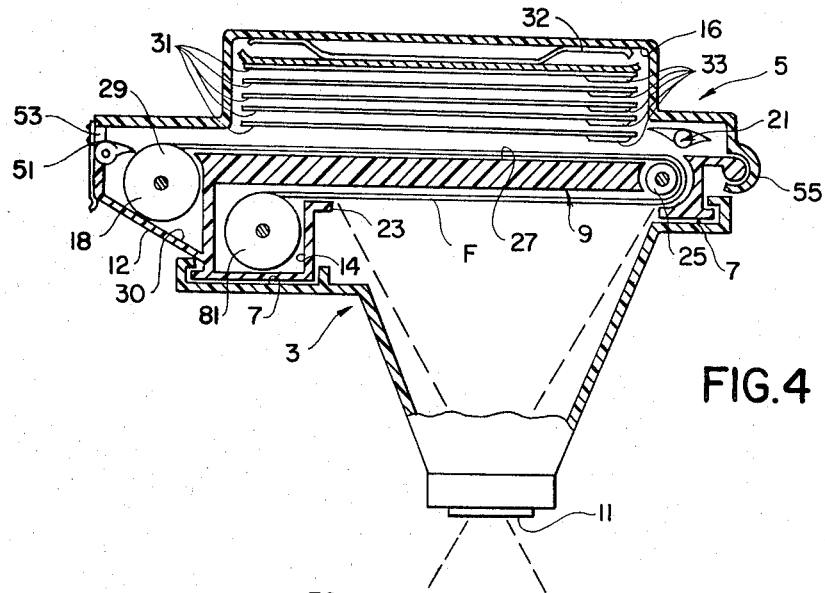
FIG. 4 is a schematic cross-sectional view of the cartridge of FIG. 1 with a camera adapted to receive such a cartridge, and depicting the respective film and process sheets in positions assumed during exposure.

Referring first to FIGS. 1 and 4, concurrently, a camera 3 is illustrated for receiving a cartridge 5 in accordance with a preferred embodiment of the present invention. The camera may be any conventional type, suitable for exposing film of the present format, and will not be described in detail except to mention the cooperating surfaces 7 for supporting the film in an exposure area 9 behind camera objective 11. The cartridge, on the other hand, is described in detail below and generally comprises a casing 12 forming a back portion of the camera and for supporting various cartridge components including the first and second supply chambers 14 and 16, take-up mechanism 18, and a processing-fluid spreading mechanism 21.

In the embodiment illustrated the supply chamber 14 contains an elongated web of photosensitive material F threaded across an exposure aperture 23, around a snubber or roller 25, through a processing chamber 27, and onto a spool 29 in take-up chamber 30. The leading end portion of the film preferably comprises a dark leader, or other light blocking means, and this leader serves for initially threading the film onto the take-up spool, as well as for protecting the film prior to loading of the cartridge into the camera. The film may be advanced through the cartridge and between the respective chambers in any suitable manner, such as by a rotatable knob 29' extending from the cartridge to a position accessible outside the camera.

The second supply chamber 16 is illustrated as containing a stack of individual second or processing sheets 31, that, in this instance, also are image receiving or transfer sheets resiliently urged toward the processing chamber by a spring 32. A pod 33 is attached at the trailing end of each of the second sheets and is adapted to be ruptured by one or more pressure applying members, such as the slider illustrated as spreading mechanism 21. In this embodiment the slider is incorporated into and forms a part of the cartridge 5, but it should be apparent that such a slider or other pressure applying means also could be mounted as part of the camera mechanism insertable into the cartridge upon loading the cartridge into the camera.

Figure 2:
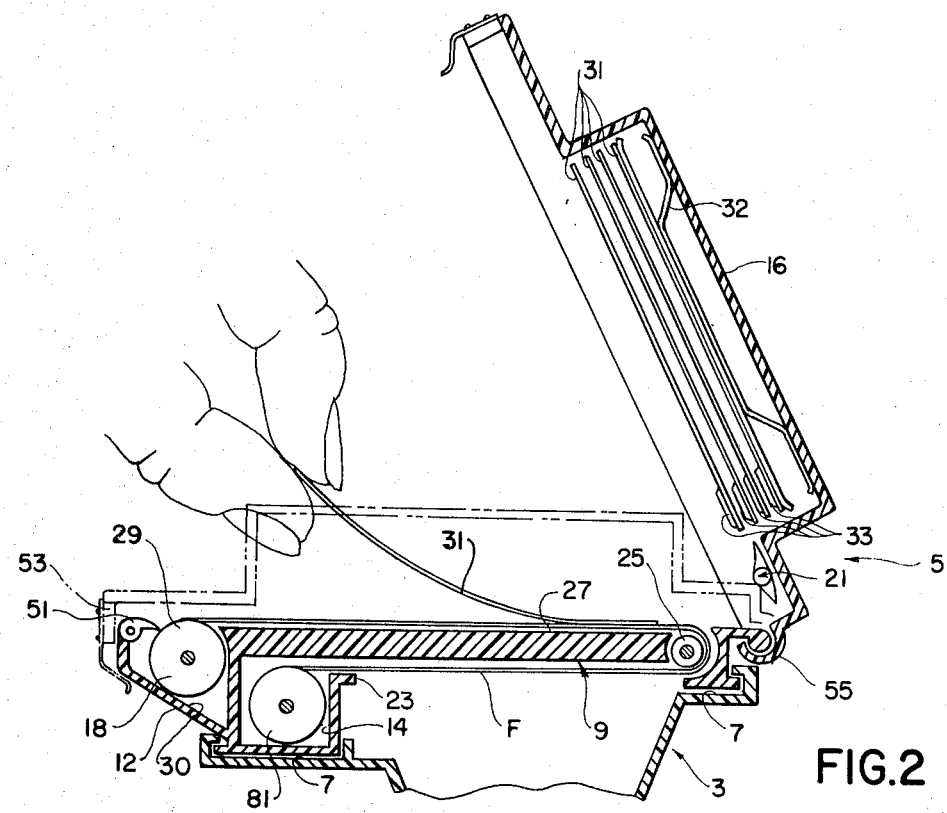
FIG. 2 is a cross-sectional schematic view of the cartridge of FIG. 1, attached to a camera, with the cartridge back open for manual removal of a finished print from the cartridge process chamber.

The cartridge additionally includes two different mechanisms by which finished prints may be recovered after processing. Referring to FIGS. 1 and 2, a stripper finger 51 is pivotally located adjacent a print exit slot 53 at one end of the cartridge, while a hinge mechanism 55 is provided at the other end. In the first mechanism the stripping finger is resiliently urged against the film adjacent the take-up spool while the web material is advanced through the camera as explained above. When the processing and print receiving sheet 31 reaches the finger it will be stripped from the film and directed from the cartridge automatically. At the same time the processing waste material will be wound onto the take-up mechanism where it can be stored for later disposal with the cartridge.

The second mechanism for removing the finished print permits opening of the cartridge back and manual engagement and stripping of the print from the film. This second mechanism is preferable when it is desirable to retrieve a finished print before taking a second picture.

Figure 5:
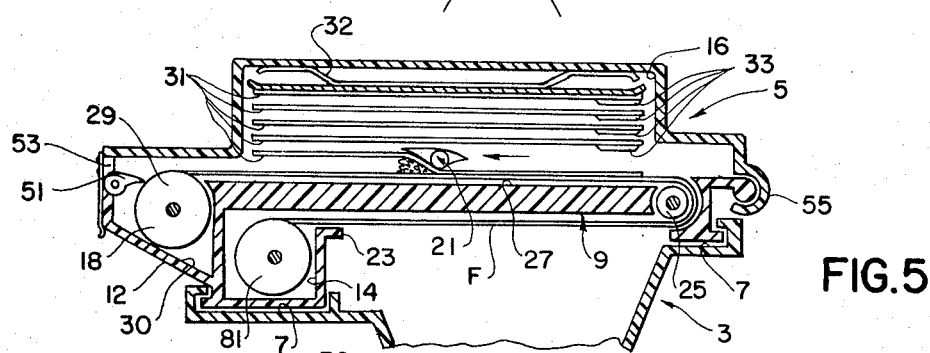
FIG. 5 is a schematic view corresponding to that of FIG. 4 but illustrating the film and second sheets in positions assumed for spreading a processing fluid between the sheets.
Figure 6:
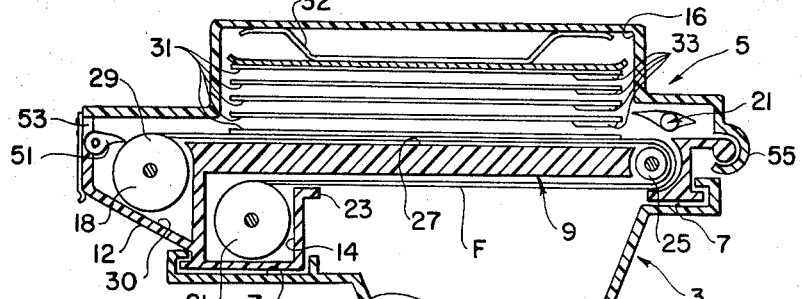
FIG. 6 is a schematic view corresponding to that of FIG. 4 but illustrating the materials during a developing and transfer stage.
Figure 7:
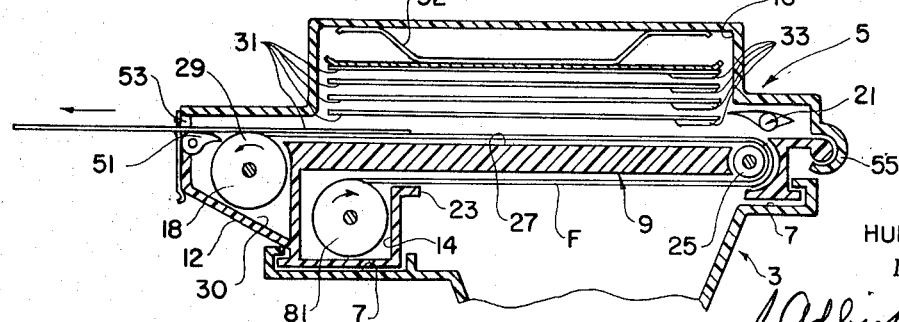
FIG. 7 is a schematic view corresponding to that of FIG. 4 and illustrating the materials after processing with the processing waste being received in the take-up mechanism and with the finished print being ejected automatically from the cartridge and camera.

Referring now to FIGS. 4–7, and more particularly to the operation of a cartridge in accordance with the present invention, the dark leader is first advanced beyond the cartridge exposure aperture 23 by winding the take-up spool 29 to thread the first film frame into position for exposure. After exposure in the usual manner, take-up spool 29 is again rotated to advance the exposed film around snubber 25 to the cartridge processing chamber 27. Then the fluid spreading mechanism 21 is operated by moving the slider to the left, as depicted in FIG. 5, to rupture the pod 33, and to force the process sheet 31 into superposition with the film while spreading the processing fluid. The unit remains in the processing chamber for a predetermined period to permit development of the latent image and, at least in the preferred embodiment, the transfer of that developed image onto the process or transfer sheet. After completion of developing and transfer of the image, the finished print (previously the process or transfer sheet) is then stripped from the web either by opening the cartridge back or by again rotating the take-up mechanism to advance the web and effect stripping and ejection of the print by stripping finger 51. In either case, the take-up mechanism is rotated at some time during or after stripping to wind the film and other processing waste material into the take-up mechanism.

Figure 3:
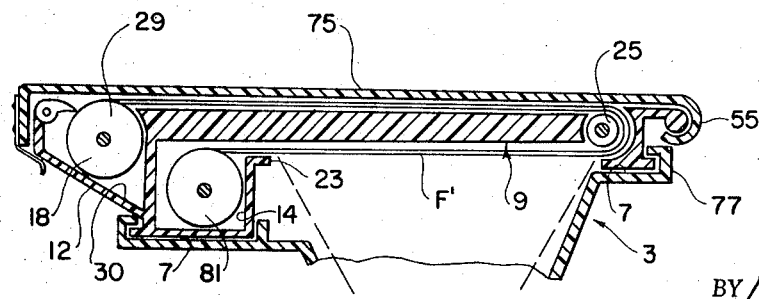
FIG. 3 is a schematic view of the cartridge of FIG. 1 with part removed (or of a different embodiment of cartridge having only one supply) and that is adapted to contain either "conventional" film or self-processing film absent the process sheets.

Referring now to FIG. 3, the cartridge of FIG. 1 is illustrated with a back portion thereof removed and replaced by a light-tight cover 75. The cover fits onto the front cartridge part 77 in much the same way as did the back cartridge part illustrated in the other figures. However, in this case, only film is adapted to be contained in the cartridge. In one embodiment, such film may be of the self-processing type and can be exposed and then stored in take-up chamber 30 for later processing. Such later processing might be accomplished by rewinding the film, through winding means 79, back onto the supply spool 81, and by replacing the cover 75 with the previously described cartridge-back containing process sheets 31. Similarly, it would be possible or even preferable in the embodiment of FIG. 3 to provide the front cartridge part with "regular" film that is mailed in the cartridge to a professional processer for development and processing. Thus, the same or similar cartridge parts could be used interchangeably for self-processing or regular film.

It should now be apparent that an improved cartridge has been provided by the present invention that is diversified in its possible uses yet is compact and convenient to handle. The cartridge may be divided into separate parts, one of which is usable independently for rapid and successive exposure of regular or self-processing film. Development then can be accomplished at a later time when it is more convenient, either by mailing the film to a professional processer or, at least in the case of self-processing film, by attaching the other part of the cartridge containing stacked process or transfer sheets. The cartridge also is designed to define the back surfaces of a camera-cartridge combination to eliminate the usual camera cover-door and to make the finished prints more accessible for manual stripping. Moreover, because the process sheets are supplied as individual units that eventually become the finished print, the print more easily can be designed for final aesthetic appearance with properly and squarely cut edges, stiffnes and uniformity of thickness. Still further, most or all of the process waste material can be wound into a take-up chamber for later disposal with the cartridge, and this material need not be handled either upon its loading into the camera before exposure or its removal therefrom after exposure. Of course other features and advantages now will be apparent to those skilled in the art and from the above description.

The invention has been described in detail with particular reference to the preferred embodiment thereof, but it will be understood that variations and modifications can be effected within the spirit and scope of the invention.

I claim:

1. A cartridge adapted for alternative use with regular and in-cartridge-processable film that is transportable within said cartridge, said cartridge being mountable on a camera having means for effecting a photographic exposure of the film in said cartridge, said cartridge comprising:
   a. a first housing including first means for receiving and storing the film prior to exposure, second means for supporting the film during exposure, third means for supporting the film during processing, fourth means for receiving and storing the film after exposure, fifth means for sequentially transporting the film from said first means, across said second and third means, and into said fourth means, and sixth means for transporting the film from said fourth means back into said first means; and
   b. a second housing removably coupled to said first housing and including seventh means for receiving and storing a process element in superposed relationship with said third means and eighth means for applying compressive pressure to the process element and film supported by said third means to initiate processing, said second housing being removable from said first housing to facilitate exposure, transport, and storage of the film when processing is not to be initiated in said cartridge.

2. A cartridge adapted for alternative use with regular and in-cartridge-processable film that is transportable within said cartridge, said cartridge being mountable on a camera having means for effecting a photographic exposure of the film in said cartridge, said cartridge comprising:
   a. a first housing including first means for receiving and storing the film prior to exposure, second means for supporting the film during exposure, third means for supporting the film during processing, fourth means for receiving and storing the film after exposure, and fifth means for sequentially transporting the film from said first means, across said second and third means, and into said fourth means;
   b. a second housing removably coupled to said first housing and including sixth means for receiving and storing a process element in superposed relationship with said third means and seventh means for applying compressive pressure to the process element and film supported by said third means to initiate processing, said second housing being removable from said first housing to facilitate exposure, transport, and storage of the film when processing is not to be initiated in said cartridge; and
   c. eighth means responsive to transport of the film into said fourth means for stripping the process element from the film.

3. A cartridge adapted for alternative use with regular and in-cartridge-processable film that is transportable within said cartridge, said cartridge being mountable on a camera having means for effecting a photographic exposure of the film in said cartridge, said cartridge comprising:
   a. a first housing including first means for receiving and storing the film prior to exposure, second means for supporting the film during exposure, third means for supporting the film during processing, fourth means for receiving and storing the film after exposure, and fifth means for sequentially transporting the film from said first means, across said second and third means, and into said fourth means;
   b. a second housing removably coupled to said first housing and including sixth means for receiving and storing a process element in superposed relationship with said third means and seventh means for applying compressive pressure to the process element and film supported by said third means to initiate processing, said second housing being removable from said first housing to facilitate exposure, transport, and storage of the film when processing is not to be initiated in said cartridge; and
   c. eighth means defining an exit slot adjacent to said fourth means for allowing egress of the process element from said cartridge in response to transport of the film into said fourth means.

4. A cartridge adapted for cooperation with a camera to effect a photographic exposure of film in the cartridge and to optionally initiate processing of the film or storage of the film without processing after the exposure, said cartridge comprising:
   a. a first cartridge part having means defining a supply chamber, an exposure chamber, and a storage chamber for supplying, exposing, and storing, respectively, the film;
   b. means supported by said first cartridge part for moving the film from said supply chamber, through said exposure chamber, and into said storage chamber;
   c. means supported by said first cartridge part for moving the film from said storage chamber back into said supply chamber; and
   d. a second cartridge part removably coupled to said first cartridge part and having means for supplying a process element to the film between said exposure chamber and said storage chamber for processing the film, said second cartridge part being removable from said first cartridge part to facilitate storage of the film without processing after the exposure.

5. A cartridge adapted for cooperation with a camera to effect a photographic exposure of film in the cartridge and to optionally initiate processing of the film or storage of the film without processing after the exposure, said cartridge comprising:
   a. a first cartridge part having means defining a supply chamber, an exposure chamber, and a storage chamber for supplying, exposing, and storing, respectively, the film;
   b. means supported by said first cartridge part for moving the film from said supply chamber, through said exposure chamber, and into said storage chamber;
   c. a second cartridge part removably coupled to said first cartridge part and having means for supplying a process element to the film between said exposure chamber and said storage chamber for processing the film and means for pressing together the process element and the film between said exposure chamber and said storage chamber to initiate processing, said second cartridge part being removable from said first cartridge part to facilitate storage of the film without processing after the exposure; and d. means operable in response to movement of the film into said storage chamber for separating the process element and the film.

6. A cartridge adapted for cooperation with a camera to effect a photographic exposure of film in the cartridge and to optionally initiate processing of the film or storage of the film without processing after the exposure, said cartridge comprising:

a. a first cartridge part having means defining a supply chamber, an exposure chamber, and a storage chamber for supplying, exposing, and storing, respectively, the film;

b. means supported by said first cartridge part for moving the film from said supply chamber, through said ex-posure chamber, and into said storage chamber;

c. a second cartridge part removably coupled to said first cartridge part and having means for supplying a process element to the film between said exposure chamber and said storage chamber for processing the film and means for pressing together the process element and the film between said exposure chamber and said storage chamber to initiate processing, said second cartridge part being removable from said first cartridge part to facilitate storage of the film without processing after the exposure; and d. means defining an exit opening adjacent to said storage chamber for permitting egress of the process ele-ment from said cartridge in response to movement of the film into said storage chamber.

* * * * *